US009935974B2

(12) United States Patent
Jain (10) Patent No.: US 9,935,974 B2
(45) Date of Patent: *Apr. 3, 2018

(54) HARDWARE-LOGIC BASED FLOW COLLECTOR FOR DISTRIBUTED DENIAL OF SERVICE (DDOS) ATTACK MITIGATION

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/055,619

(22) Filed: Feb. 28, 2016

(65) Prior Publication Data

US 2016/0308901 A1    Oct. 20, 2016

Related U.S. Application Data

(63) Continuation of application No. 14/665,523, filed on Mar. 23, 2015, now Pat. No. 9,276,955, which is a (Continued)

(51) Int. Cl.
*H04L 29/06*    (2006.01)

(52) U.S. Cl.
CPC ...... *H04L 63/1458* (2013.01); *H04L 63/1416* (2013.01); *H04L 63/1425* (2013.01); *H04L 63/164* (2013.01); *H04L 2463/141* (2013.01)

(58) Field of Classification Search
CPC ............. H04L 63/1458; H04L 63/1416; H04L 63/164; H04L 63/1425; H04L 2463/141;
(Continued)

(56) References Cited

U.S. PATENT DOCUMENTS 7,100,195 B1 *  8/2006  Underwood ........ G06F 9/4443
                                              707/999.009
7,512,787 B1 *  3/2009  Viswanath ............ H04L 63/08
                                              713/160
(Continued)

OTHER PUBLICATIONS

Non-Final Rejection for U.S. Appl. No. 14/488,697 dated Apr. 30, 2015.
(Continued)

*Primary Examiner* — Saleh Najjar
*Assistant Examiner* — Shu Chun Gao
(74) *Attorney, Agent, or Firm* — Hamilton, DeSanctis & Cha LLP (57) ABSTRACT

Methods and systems for an integrated solution to flow collection for determination of rate-based DoS attacks targeting ISP infrastructure are provided. According to one embodiment, a method of mitigating DDoS attacks is provided. Information regarding at least one destination within a network for which a distributed denial of service (DDoS) attack status is to be monitored is received by a DDoS attack detection module coupled with a flow controller via a bus. The DDoS attack status is determined for the at least one destination based on the information regarding the at least one destination. When a DDoS attack is detected the flow controller is notified of the DDoS attack status for the at least one destination by the DDoS attack detection module. Responsive thereto, the flow controller directs a route reflector to divert traffic destined for the at least one destination to a DDoS attack mitigation appliance within the network.

5 Claims, 5 Drawing Sheets

Related U.S. Application Data continuation of application No. 14/488,697, filed on Sep. 17, 2014, now abandoned.

(58) Field of Classification Search
CPC ..... H04L 63/1491; H04L 69/22; H04L 69/16; H04L 69/322; H04L 63/08; H04L 63/1408; H04L 63/1441; H04L 61/2514; H04L 61/2557; H04L 61/2539; H04L 47/22; H04L 41/5025; H04L 43/10; H04L 47/24; H04L 43/0888; G06F 21/554; G06F 2221/2119; G06Q 10/0631; G06Q 10/0635; G06Q 10/06375; G06Q 10/103; G06Q 30/0201; G06Q 30/08; G06Q 40/04; G06Q 50/188; G06Q 20/22; G06Q 40/00; H04W 16/28; H04W 64/003; H04W 72/082; H04W 84/18

See application file for complete search history.

(56) References Cited

U.S. PATENT DOCUMENTS

| | | | |
|---|---|---|---|
| 8,281,400 B1 | 10/2012 | Eater et al. | |
| 8,769,662 B2 | 7/2014 | Ji et al. | |
| 8,843,643 B2 * | 9/2014 | Larson | H04L 29/12066 709/227 |
| 9,276,955 B1 | 3/2016 | Jain | |
| 9,392,010 B2 | 7/2016 | Friedman et al. | |
| 2006/0146816 A1 | 7/2006 | Jain | |
| 2007/0245420 A1 | 10/2007 | Yong et al. | |
| 2008/0043620 A1 | 2/2008 | Ye | |
| 2008/0062891 A1 | 3/2008 | Van der Merwe et al. | |
| 2010/0103837 A1 | 4/2010 | Jungcj et al. | |
| 2011/0238855 A1 * | 9/2011 | Korsunsky | G06F 21/55 709/231 |
| 2012/0240185 A1 * | 9/2012 | Kapoor | H04L 63/1425 726/1 |
| 2013/0044758 A1 | 2/2013 | Nguyen et al. | |
| 2013/0117847 A1 | 5/2013 | Friedman et al. | |
| 2013/0322255 A1 | 12/2013 | Dillon | |
| 2014/0047539 A1 | 2/2014 | Holloway et al. | |
| 2014/0075557 A1 | 3/2014 | Balabine et al. | |
| 2014/0325649 A1 | 10/2014 | Zhang et al. | |
| 2016/0080411 A1 | 3/2016 | Jain | |

OTHER PUBLICATIONS

Non-Final Rejection for U.S. Appl. No. 14/488,697 dated Nov. 10, 2014.

Notice of Allowance for U.S. Appl. No. 14/665,523 dated Jan. 20, 2016.

Non-Final Rejection for U.S. Appl. No. 14/665,523 dated Sep. 3, 2015.

* cited by examiner

HARDWARE-LOGIC BASED FLOW COLLECTOR FOR DISTRIBUTED DENIAL OF SERVICE (DDOS) ATTACK MITIGATION

CROSS-REFERENCE TO RELATED PATENTS

This application is a continuation of U.S. patent application Ser. No. 14/665,523, filed on Mar. 23, 2015, which is a continuation of U.S. patent application Ser. No. 14/488,697, filed on Sep. 17, 2014, both of which are hereby incorporated by reference in their entirety for all purposes.

This application may relate to the subject matter of U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", and U.S. Pat. No. 7,626,940 entitled "System and method for integrated header, state, rate and content anomaly prevention for domain name service" all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2016, Fortinet, Inc.

FIELD

Embodiments of the present invention relate generally to intrusion prevention and more particular to a system and method for the prevention of distributed denial of service (DDoS) attacks on Internet Service Provider (ISP) infrastructure.

DESCRIPTION OF THE BACKGROUND ART

Distributed DoS (DDoS) attack mitigation appliances have been in use due to increasing distributed denial of service attacks. As more such attacks are launched, the Internet Service Provider (ISP) network infrastructure bears the brunt of such attacks. The infrastructure consists of many routers and switches via which Internet Protocol (IP) protocol packets flow. A surge in these packets overloads ISP equipment and causes them to slow down, which in turn slows down the service provided by the ISP. ISPs need to protect their infrastructure from such attacks; and in particular need to protect their core routers from becoming overloaded. As such, ISPs need a way to address DDoS attacks in a such that these attacks are stopped closer to their sources, i.e., closer to the edge routers, thereby better protecting the ISPs' core routers.

Many systems have been previously designed that collect flow data from routers using software. Such flow collectors can then determine if there is a surge of incoming packets and divert the traffic to scrubbing appliances. As one skilled in the art knows, software appliances have performance limits. Additionally, determining baseline traffic granularly and predicting future traffic adaptively are key missing components in existing solutions. Clearly, a new method and system is needed to collect flow data using hardware logic and determine the presence of such attacks behaviorally and adaptively in a short time and with better performance.

SUMMARY

Methods and systems are described for an integrated solution to flow collection for determination of rate-based DoS attacks targeting ISP infrastructure. According to one embodiment, a method of mitigating DDoS attacks is provided. Information regarding at least one destination within a network for which a distributed denial of service (DDoS) attack status is to be monitored is received by a DDoS attack detection module coupled with a flow controller via a bus. The DDoS attack status is determined for the at least one destination based on the information regarding the at least one destination. When a DDoS attack is detected the flow controller is notified of the DDoS attack status for the at least one destination by the DDoS attack detection module. Responsive thereto, the flow controller directs a route reflector to divert traffic destined for the at least one destination to a DDoS attack mitigation appliance within the network.

Other features of embodiments of the present disclosure will be apparent from accompanying drawings and from detailed description that follows.

DETAILED DESCRIPTION

Methods and systems are described for an integrated solution to rate-based DoS attacks targeting service provider networks. According to one embodiment, a flow collector is capable of receiving a variety of flow statistics in industry standards from routers and switches. These flow statistics may be in the form of packets in protocols, including, but not limited to, NetFlow, JFlow, SFlow, CFlow and the like. The hardware-based apparatus collects this data and converts them to granular rate statistics in a round robin database for varying periods such as past hour, past day, past week, past month, past year etc. Based on the past granular traffic statistics, the apparatus can determine corresponding rate-thresholds through continuous and adaptive learning. Once these granular rate thresholds are breached for any traffic parameter, the apparatus can determine the networks being attacked or protocols or transmission control protocol (TCP) or user diagram protocol (UDP) ports under attack once the corresponding adaptive thresholds are violated. In an exemplary embodiment of this invention, the router closer to the edge can then be requested to divert the affected traffic to a scrubbing center potentially including multiple scrubbing appliances. The techniques for such diversion and scrubbing are described well in the literature and are thus not elaborated upon further herein.

In one embodiment, a single hardware-logic based appliance collects traffic statistics data from multiple routers and switches in a service provider network. It then integrates multiple mechanisms to determine the current granular traffic rate to multiple destinations and determines if any of the protected destinations are having a rate anomaly based on behavioral threshold estimation. The collector then informs the route reflector to divert the traffic destined to the destination network via a scrubbing appliance. The scrubbing appliance then forwards the cleansed traffic on to the eventual destination in a way to avoid any routing loops.

The new appliance described herein provides copper and optical connectivity. A packet interface block interfaces with external network via a physical layer (PHY) and switch device that contains the Media Access Control (MAC) layer. The packet interface block forwards packets to packet processing logic.

The packet processing logic gets the flow statistics packets from the packet interface. A network flow can be defined in many ways, for example, Cisco standard NetFlow version 5 defines a flow as a unidirectional sequence of packets that all share the following 7 values: 1. Ingress interface (SNMP ifIndex); 2. Source IP address; 3. Destination IP address; 4. IP protocol; 5. Source port for User Datagram Protocol (UDP) or Transmission Control Protocol (TCP), 0 for other protocols; 6. Destination port for UDP or TCP, type and code for Internet Control Message Protocol (ICMP), or 0 for other protocols; and 7. IP Type of Service. A flow statistics record can contain a wide variety of information about the traffic in a given flow. An exemplary flow statistics record from NetFlow is described below in Table 1.

According to one embodiment, the purpose of the packet processing logic is to determine the instantaneous granular rates and enforce a policy based on the granular rate thresholds. It does this via storing the granular packet rates in an internal or external granular metering memory. Exemplary derived granular rate parameters are described below in Table 2. Rate anomaly meters inside the packet processing logic receive classifier output and maintain the instantaneous packet-rates and compare them against the thresholds set adaptively and continuously by the controlling host.

In one embodiment, if a specific type of packets exceeds the rate threshold, packets of that type and belonging to a destination are diverted to a scrubbing appliance via a message to the route reflector.

An object of various embodiments of the present invention is to provide a high-rate hardware based integrated system and method of determining attacks to a destination, the destination having layers 3, 4, and 7 rate anomalies as detected by the system, which is continuously and adaptively adjusting rate thresholds.

Another object of various embodiments of the present invention is to provide a mechanism to communicate the affected destination to the route reflector so that it can divert the traffic via an inline attack mitigation device.

A still further object of various embodiments of the present invention is to provide a rate anomaly engine capable of continuously calculating the traffic rate on classified granular traffic parameters and estimating the traffic rate thresholds adaptively and thus determining the threshold violations on traffic parameters, such as SYN packets/second, protocol packets/second and/or concurrent connections/destination.

Figure 1:
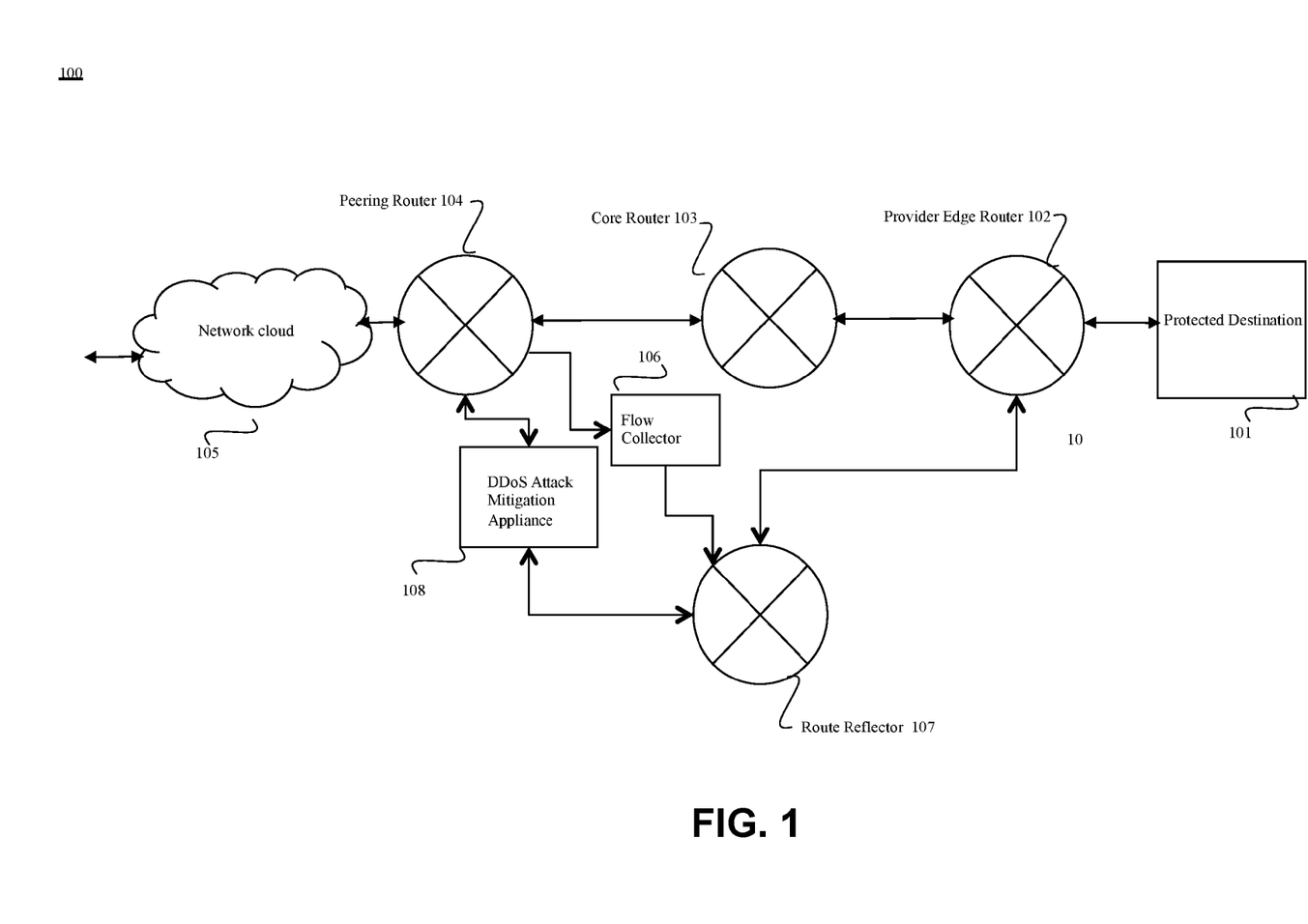
FIG. 1 illustrates an exemplary system employing a flow collector in accordance with an embodiment of the present invention.

FIG. 1 depicts an exemplary flow collector apparatus 106 illustrating the functionality of an integrated system 100 for the mitigation of distributed denial of service attacks on a service provider network in accordance with an embodiment of the present invention. A protected destination 101 is usually behind customer edge router (not shown). The customer edge router is connected to a provider edge router 102. In an exemplary embodiment of this invention, provider edge router 102 is connected to a core router 103, which in turn is connected to a peering router 104. Peering router 104 is in turn connected to a public network, such as the Internet, via a network cloud 105. Multiple of such peering routers may be connected in a typical network via core router 103.

When there is a distributed denial of service attack on protected destination 101, the packets overload not just protected destination 101, but the intervening routers, including provider edge router 102, core router 103 and peering router 104. In the context of the present example, a flow collector or traffic statistics collector 106 is provided that can determine the attack and request a router reflector 107 to send the traffic destined to protected destination 101 via route reflector 107 such that DDoS attack mitigation appliance 108 cleanses the attack inline and then forwards the traffic via route reflector 107 to protected destination 101. When the traffic returns to normal, the traffic diversion is removed and the traffic is routed to protected destination 101 through core router 103. In this manner, core router 103 is protected from DDoS attacks. Various techniques for traffic diversion, and forwarding via tunnels to avoid routing are known to those skilled in the art and therefore not elaborated upon further herein. Those desiring additional background on such techniques are directed to one or more of: (i) the chapter entitled "Configuring Traffic Diversion" of the Cisco Guard Configuration Guide, Software Release 6.0 dated February 2007 (currently available via the Web at http://www.cisco.com/en/US/docs/security/anomaly_detection_mitigation/appliances/guard/v6.0/configuration/guide/advsn.html); (ii) U.S. Pat. No. 7,225,270; (iii) U.S. Pat. No. 7,665,135; and (iv) U.S. Pat. No. 8,510,826 each of which is hereby incorporated by reference in its entirety for all purposes.

Figure 2:
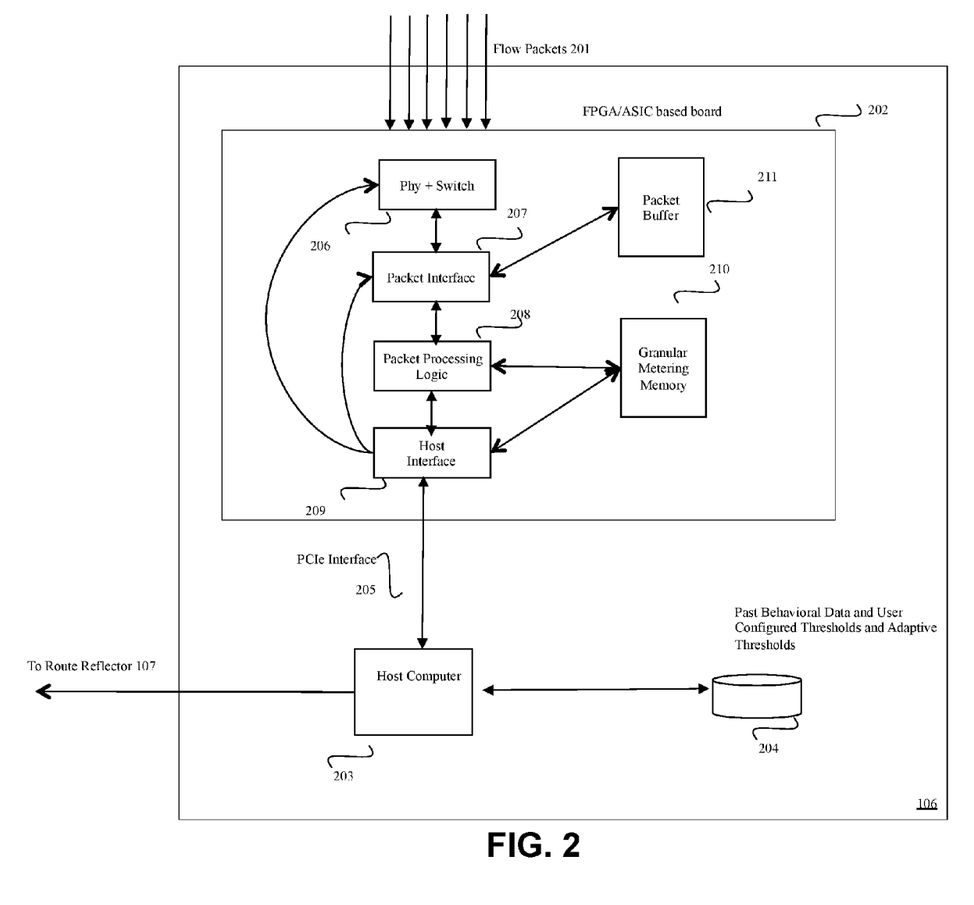
FIG. 2 schematically shows architectural details of the flow collector of FIG. 1 in accordance with an embodiment of the present invention.

FIG. 2 illustrates further details of flow collector 106 from FIG. 1 in accordance with an embodiment of the present invention. In the context of the present example, flow packets 201 are processed via a hardware logic board, which may be implemented using one or more Field-Programmable Gate Arrays (FPGAs) and/or Application Specific Integrated Circuits (ASICs). In one embodiment, board 202 (which may more generally be referred to herein as a DDoS attack detection module or a hardware module) consists of a PHY and switch 206 that allows interfacing with external connectors, including, but not limited to, RJ-45 or fiber interfaces, and allows forwarding packets to other components on board 202. Packet interface block 207 receives packets, buffers them in a packet buffer 211 and serially releases them to the subsequent logic.

Packet processing logic 208 receives traffic flow statistics packets from packet interface 207. Packet processing logic 208 uses a granular metering memory 210 to calculate and derive granular packet rates and to determine if there are any threshold violations. In one embodiment, granular metering memory 210 may be partially inside FPGA/ASIC based board 202 and large blocks of memory may be external, for example, in a Double Data Rate (DDR) memory. According to an embodiment of this invention, a host computer 203 can read the granular packet rate parameters via host interface

209. In the present example, Host computer 203 is connected to board 202 via a Peripheral Component Interconnect Express (PCIe) interface 205. Those skilled in the art will appreciate a variety of alternative interfaces may be used. Host computer 203 can similarly set the granular packet rate thresholds based on past behavior for that granular rate parameter.

In one embodiment of this invention, host computer 203 stores the derived granular traffic statistics in multiple round-robin databases (RRDs) 204. According to an embodiment of this invention, RRDs 204 allow the statistics to be stored in a round robin way for the last 1 hour, 8 hours, 1 day, 1 week, 1 month and 1 year. Depending upon the particular implementation, the storage timeframes may differ.

In one embodiment of this invention, host computer 203 can use RRDs 204 to forecast future traffic based on past traffic for granular parameters using techniques well known to those skilled in the art. Examples of these techniques include, but are not limited to, exponential smoothing and the Holt-Winters forecasting method. This ensures that the thresholds are continuously and adaptively adjusted if they go above the user configured minimum value. It also ensures that the average, trend and seasonality of the granular rates are used to predict the thresholds over time to match with the traffic.

Packet processing logic 208 continuously monitors the packet rates per second on multiple granular parameters based on the threshold set by host computer 203. When the traffic exceeds the threshold for a particular granular parameter, the affected destination is identified. According to one embodiment, host interface 209 then interrupts host computer 203. Host computer 203 then sends a message to route reflector 107. Further, when the traffic returns to normal ranges, host interface 209 may also interrupt host computer 203 so that host computer 203 may inform route reflector 107.

Figure 3:
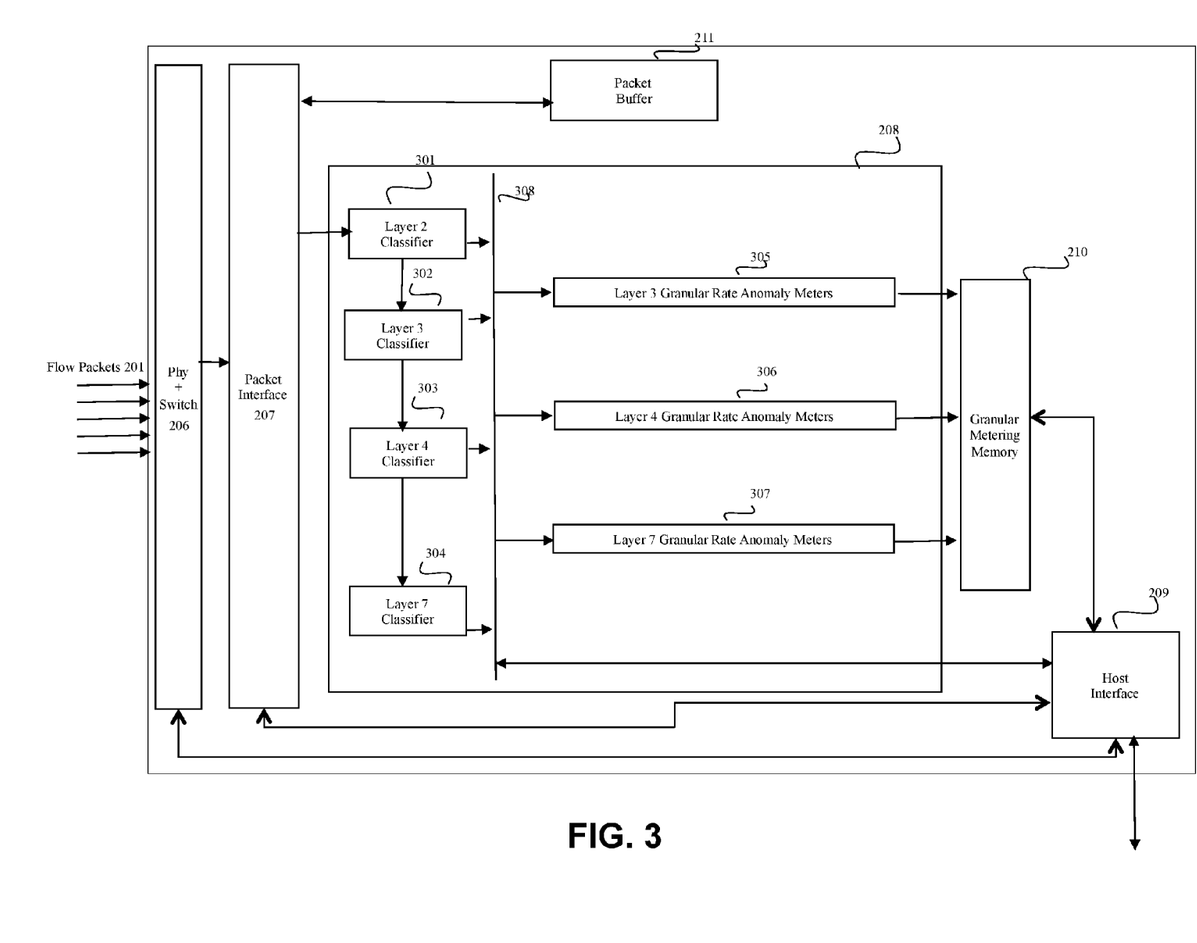
FIG. 3 illustrates further implementation details of packet processing logic and related components in accordance with an embodiment of the present invention.

FIG. 3 further illustrates details for FPGA/ASIC board 202 in accordance with an embodiment of the present invention. FIG. 3 also illustrates further details of packet processing logic 208 in accordance with an embodiment of the present invention.

When a flow statistics packet arrives from packet interface 207, a layer 2 classifier 301 receives frames from packet interface 201 and classifies packets based on their layer 2 characteristics and ensures that it is a supported layer 2 packet, such as an Ethernet 802.3 frame. Layer 2 classifier 301 also parses the layer 2 headers and passes that information to subsequent logic blocks over a classification bus 308. In an exemplary embodiment of this invention, layer 2 classifier 301 block can parse Ethernet frames and IEEE 802.2/3 frames and can determine Address Resolution Protocol (ARP), Reverse ARP (RARP), broadcast, Internet Protocol (IP), multicast, non-IP, virtual local are network (VLAN) tagged frames, and double encapsulated VLAN tagged frames.

Layer 3 classifier 302 receives packet data as well as layer 2 classifier information from layer 2 classifier 301. Layer 3 classifier 302 extracts the layer 3 header information in IP version 4 (IPv4) and IP version 6 (IPv6) headers and passes it on to the subsequent logic over classification bus 308. In some embodiments of this invention, layer 3 classifier 302 parses IPv4 and IPv6 packets and determines properties, including, but not limited to, type of service (TOS), IP Options, fragmentation, and protocol.

Layer 4 classifier 303, similarly, parses the layer 4 information from packets that are guaranteed to be in order with respect to fragmentation. In an exemplary embodiment, this classifier looks at Transmission Control Protocol (TCP), User Datagram Protocol (UDP), Internet Control Message Protocol (ICMP), Internet Protocol security (IPSec)-Encapsulating Security Payload (ESP), and IPSec-Authentication Header (AH). This information is passed to the subsequent blocks over classification bus 308. In an exemplary embodiment of this invention, this classifier can parse layer 4 information, including, but not limited to, TCP Options, TCP ports, UDP Ports, ICMP types/codes, TCP flags, sequence numbers, ACK numbers and the like. Packets that are anomalous may be dropped.

Layer 7 classifier 304, similarly, parses the layer 7 information from packets. In an exemplary embodiment, this classifier looks at TCP, UDP packets and parses layer 7 traffic flow statistics from protocols, including, but not limited to, NetFlow, sFlow, jFlow and CFlow. This information is passed to the subsequent blocks over classification bus 308.

Layer 3 rate anomaly meters 305 utilize the output of layer 3 classifier 302 and derive layer 3 granular rates for identified destinations and enforce layer 3 granular rate thresholds based thereon.

Layer 4 rate anomaly meters 306 utilize the output of layer 4 classifier 303 and derive layer 4 granular rates for identified destinations and enforce layer 4 granular rate thresholds based thereon.

Layer 7 rate anomaly meters 306 utilize the output of layer 7 classifier logic 304 and derive layer 7 granular rates for identified destinations and enforce layer 7 granular rate thresholds based thereon.

Figure 4:
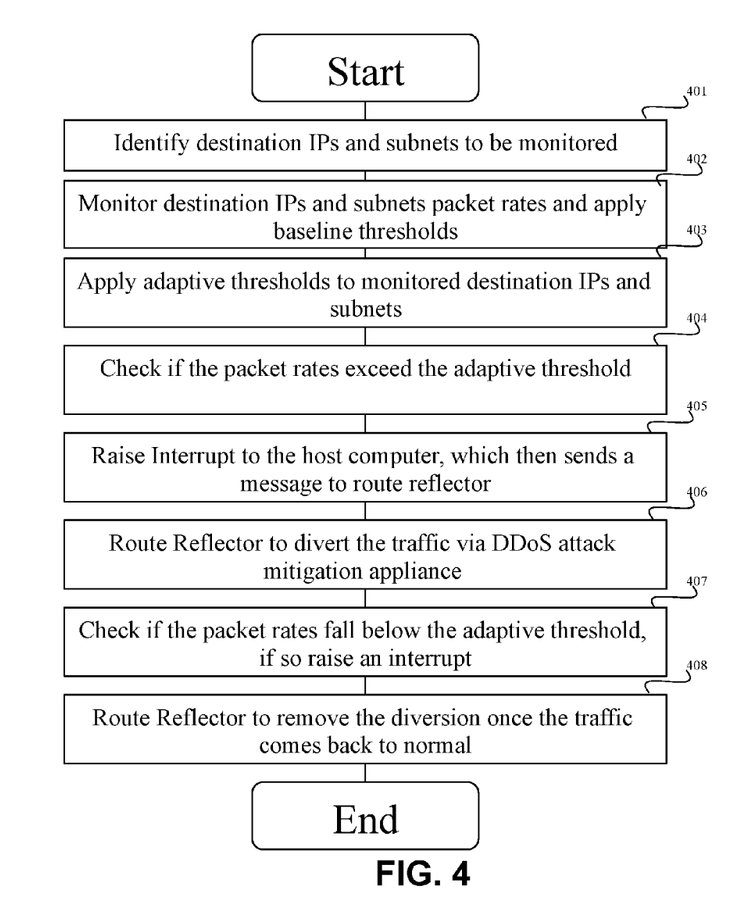
FIG. 4 further illustrates the overall process for the traffic rate collection, breach detection and traffic diversion in accordance with an embodiment of the present invention.

FIG. 4 further illustrates an overall process for traffic rate collection, breach detection and traffic diversion in accordance with an embodiment of the present invention.

At block 401, information is received regarding destination IPs and subnets to be monitored. For example, an administrator of the system may input the destination IP addresses and subnets to be monitored.

At block 402, host computer 203 continuously monitors these destination IPs and subnets via granular metering memory 210, for example. After a representative period, a granular traffic baseline is generated and is used to set the thresholds.

At block 403, host computer 203 continuously adjust the granular thresholds based on the past traffic stored in RRDs 204. According to one embodiment, if the estimated threshold is higher than the configured minimum threshold, the estimated threshold is used. If the estimated threshold is higher than the adaptive limit configured by the administrator, it is restricted to the adaptive limit. Thus, in one embodiment, the adaptive threshold set in the hardware logic is always between configured minimum threshold and adaptive limit.

At block 404, FPGA/ASIC board 202 ensures that the granular traffic rate to a monitored destination doesn't exceed the adaptive threshold. In one embodiment, if the traffic exceeds the adaptive threshold, the destination IP or subnet is identified as being under attack.

In block 405, assuming an attack has been identified, host computer 203 is notified. In one embodiment, host interface 209 raises an interrupt that is serviced by host computer 203. Host computer 203 then causes route reflector 207 to be made aware of same, for example, by sending a message to route reflector 107.

At block 406, route reflector 107 diverts the traffic destined to the destination under attack via DDoS attack mitigation appliance 108. Route reflector 107 also ensures that the diversion doesn't cause any routing loops.

At block 407, FPGA/ASIC board 202 determines whether the granular traffic rate to a monitored destination has fallen below the adaptive threshold. If so, then the destination IP or subnet is identified as no longer being under attack/out of attack and host computer 203 is notified of same, for example, by host interface 209 raising an interrupt that is serviced by host computer 203. The host computer then causes route reflector 107 to be made aware of same, for example, by sending a message to route reflector 107.

At block 408, route reflector 107 removes the diversion of the traffic destined to the destination. Thus the traffic now once again flows to the destination via core router 103.

TABLE 1

Exemplary flow statistics format-NetFlow V5-flow record

| Bytes | Contents | Description |
| --- | --- | --- |
| 0-3 | srcaddr | Source IP address |
| 4-7 | dstaddr | Destination IP address |
| 8-11 | nexthop | IP address of next hop router |
| 12-13 | input | SNMP index of input interface |
| 14-15 | output | SNMP index of output interface |
| 16-19 | dPkts | Packets in the flow |
| 20-23 | dOctets | Total number of Layer 3 bytes in the packets of the flow |
| 24-27 | First | SysUptime at start of flow |
| 28-31 | Last | SysUptime at the time the last packet of the flow was received |
| 32-33 | srcport | TCP/UDP source port number or equivalent |
| 34-35 | dstport | TCP/UDP destination port number or equivalent |
| 36 | pad1 | Unused (zero) bytes |
| 37 | tcp_flags | Cumulative OR of TCP flags |
| 38 | Prot | IP protocol type (for example, TCP =6; UDP =17) |
| 39 | tos | IP type of service (ToS) |
| 40-41 | src_as | Autonomous system number of the source, either origin or peer |
| 42-43 | dst_as | Autonomous system number of the destination, either origin or peer |
| 44 | src_mask | Source address prefix mask bits |
| 45 | dst mask | Destination address prefix mask bits |
| 46-47 | pad2 | Unused (zero) bytes |

Table 2 describes exemplary granular parameters according to an embodiment of this invention.

TABLE 2

Exemplary granular behavioral parameters extracted from flow statistics

| Name | Unit |
| --- | --- |
| TCP SYN | Packets persecond |
| TCP ACK | Packets persecond |
| TCP RST | Packets persecond |
| TCP FIN | Packets persecond |
| Concurrent Connections | Count |
| New Connections | Per second |
| Established Connections | Count |
| Unique sources | Count |

Figure 5:
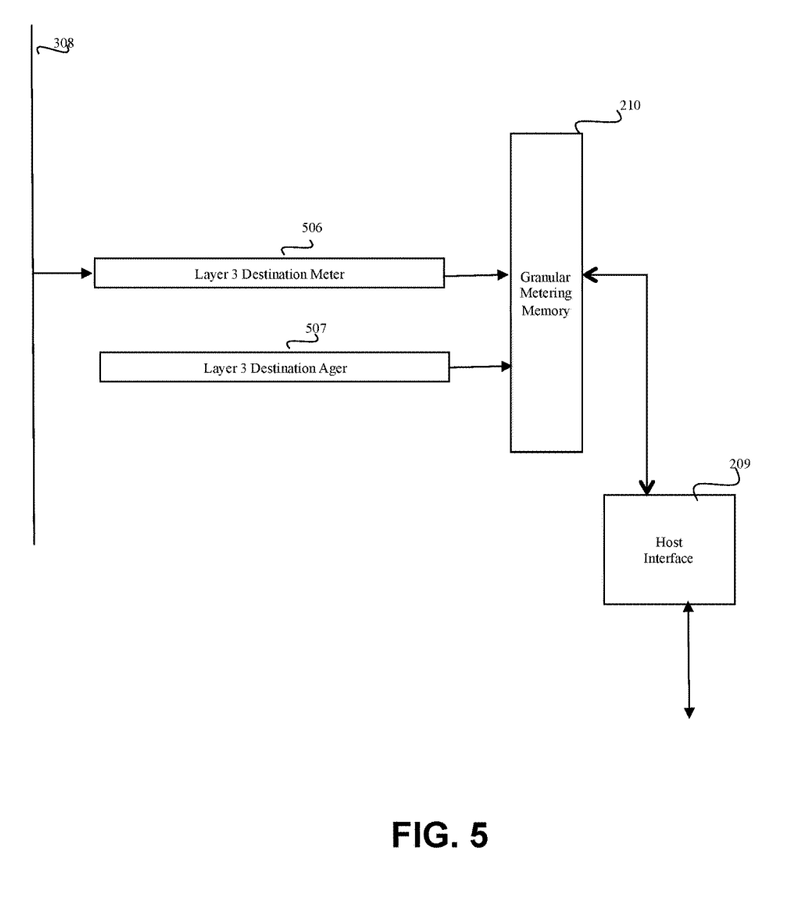
FIG. 5 further illustrates an exemplary process for deriving granular traffic statistics from traffic flow statistics in accordance with an embodiment of the present invention.

FIG. 5 further illustrates an exemplary process for deriving granular traffic statistics from traffic flow statistics in accordance with an embodiment of the present invention. According to one embodiment, layer 3 destination meter 506 is part of multiple logic components of layer 3 granular rate anomaly meter 305. When layer 3 destination meter 506 receives the flow statistics classification from classifier bus 308, it waits for destination IP to be seen, it increments the rate for that destination in a memory table in granular metering memory 210. As more and more packets come for that destination, the count for the destination increases. If the count exceeds the threshold set by host computer 203 via host interface 209, it interrupts host computer 203 via host interface 209.

At a predefined interval, layer 3 destination ager 507 resets the count for the destination to zero. Layer 3 destination ager 507 then stores the packet rate for the destination being monitored. This packet rate can then be read by host computer 203 via host interface 209 and can be used for adaptive threshold estimation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method comprising:

receiving from one or more routers within a protected network, by a distributed denial of service (DDoS) attack detection module coupled with a flow controller via a host interface, flow statistics packets;

parsing, by the DDoS attack detection module, the flow statistics packets at layer 2 and validating Ethernet frames;

parsing, by the DDoS attack detection module, the flow statistics packets at layer 3 and validating Internet Protocol (IP) version 4 (IPv4) and IP version 6 (IPv6) packets;

parsing, by the DDoS attack detection module, the flow statistics packets at layer 4 and validating Transmission Control Protocol (TCP) and User Datagram Protocol (UDP) packets;

parsing, by the DDoS attack detection module, the flow statistics packets at layer 7 and validating protocol data units associated with one or more flow statistics protocols;

deriving, by the DDoS attack detection module, relevant fields from layer 3, layer 4 and layer 7 and calculating based thereon layer 3 granular rates, layer 4 granular rates and layer 7 granular rates, respectively;

determining, by the DDoS attack detection module, a DDoS attack status of at least one monitored destination coupled to or within the protected network based on observed rate anomalies by comparing the derived layer 3 granular rates, the derived layer 4 granular rates, the layer 7 granular rates with corresponding rate thresholds;

responsive to determining the at least one monitored destination is under attack, interrupting the flow controller, by the DDoS attack detection module, via the host interface; and causing traffic destined for the at least one monitored destination to be diverted by a route reflector within the protected network to a DDoS attack mitigation appliance within the protected network by responsive to the interrupt, informing, by the flow controller, the route reflector regarding the determined DDoS attack status.

2. The method of claim 1, further comprising:

receiving, by the flow controller, user policies including network and IP addresses to be monitored;

configuring, by the flow collector, the DDoS attack detection module to monitor for DDoS attacks on the received network and IP addresses;

reading from the DDoS attack detection module, by the flow controller, the derived layer 3 layer 3 granular rates, the derived layer 4 granular rates and the layer 7 granular rates;

calculating, by the flow controller, the corresponding rate thresholds; and writing, by the flow controller, the corresponding rate thresholds to the DDoS attack detection module.

3. The method of claim 2, further comprising:

receiving from the flow controller the corresponding rate thresholds, by the host interface, via host commands; and raising an interrupt, by the host interface, that is serviced by the flow controller when one or more of the corresponding rate thresholds are exceeded or when traffic returns to normal.

4. The method of claim 1, further comprising classifying, by the DDoS attack detection module, the flow statistics packets and retrieving one or more of layer 2, layer 3, layer 4 and layer 7 header information from the flow statistics packets.

5. The method of claim 1, wherein the protected network comprises a service provider network and the method further comprises ceasing diversion of the traffic and allowing the traffic destined for the at least one monitored destination to flow via a core router of the service provider network.

* * * * *